United States Patent
Ito

(10) Patent No.: US 6,996,416 B2
(45) Date of Patent: Feb. 7, 2006

(54) PORTABLE WIRELESS COMMUNICATION TERMINAL AND CONTROL METHOD

(75) Inventor: Koichi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 09/948,395

(22) Filed: Sep. 7, 2001

(65) Prior Publication Data

US 2002/0077147 A1 Jun. 20, 2002

(30) Foreign Application Priority Data

Sep. 12, 2000 (JP) .......................... 2000-276068

(51) Int. Cl.
*H04M 1/00* (2006.01)

(52) U.S. Cl. ................. 455/556.1; 455/127.1; 455/344; 455/522

(58) Field of Classification Search ............ 455/343, 455/69, 522, 556.1, 552, 344, 127.1
See application file for complete search history.

(56) References Cited

U.S. PATENT DOCUMENTS

| 5,541,929 A | * | 7/1996 | Jokura ..................... 370/337 |
| 5,991,637 A | | 11/1999 | Mack, II et al. |
| 6,477,358 B1 | * | 11/2002 | Mader et al. ............. 455/91 |
| 6,532,357 B1 | * | 3/2003 | Ichikawa ................. 455/126 |
| 6,625,478 B1 | * | 9/2003 | Nonogaki ................ 455/574 |

FOREIGN PATENT DOCUMENTS

| EP | 1 033 859 | 9/2000 |
| WO | WO 99 49583 | 9/1999 |

\* cited by examiner

*Primary Examiner*—Fan Tsang
*Assistant Examiner*—Aung T Win
(74) *Attorney, Agent, or Firm*—Frommer Lawrence & Haug LLP; William S. Frommer

(57) ABSTRACT

A portable wireless communication terminal having a wireless communication function and a music recording and/or replaying function determines whether the wireless communication function is to be disable or not when an user selects the music recording/replaying function. The wireless communication function is enabled or disabled based on a result of the determination. More particularly, noise interference to the music recording/replaying function is alleviated by decreasing a transmitting power of the portable wireless communication terminal by a predetermined amount during music recording/replaying operation.

19 Claims, 4 Drawing Sheets

PORTABLE WIRELESS COMMUNICATION TERMINAL AND CONTROL METHOD

CROSS REFERENCE TO RELATED APPLICATION

This application claims priority to Japanese Patent Application No. JP 2000-276068, and the disclosure of that application is incorporated herein by reference to the extent permitted by law.

BACKGROUND OF THE INVENTION

1. Field of the Invention

The present invention relates to a portable wireless communication terminal having a music record/replay function in addition to a wireless communication function, and to its control method.

2. Description of the Related Art

The portable wireless communication terminal as typified by a portable phone has been widely used not only in business but also in private. Various services such as data communication service are available as well as voice communication service. Further, according to development of communication technology, various types of wireless communication systems for different areas, different communication service providers, different services or the like can be operated simultaneously thereby enabling communication with a calling terminal or use of plural wireless systems by emitting a prescribe level of radio wave from his/her own communication terminal.

As to the radio wave level transmitted from the communication terminal, for example, a transmission peak power of about two watts is set for a portable phone in a pan-European digital cellular phone system (GSM).

Recently, a new portable phone with an additional function for recording/replaying music information is introduced to a market. This type of the phone is a commercial product in which functions of audio apparatus and portable phone are integrated.

SUMMARY OF THE INVENTION

However, there are some problems in these portable phones. When the portable phone is transmitting radio wave from its antenna during an operation mode for communication or renewing of a location registration, the transmitted radio wave couples electro-magnetically with its audio apparatus disposed in close vicinity. Accordingly, a noise (called TDMA noise) is generated and heard through a speaker or ear-phone of the audio apparatus.

Furthermore, when the above-described portable phone with recording/replaying function receives a call during recording or replaying of music information, the portable phone starts to perform functions of the portable phone as well as functions of the audio apparatus. Performing such functions of the portable phone enables the transmission from its antenna, and the transmission in turn makes adverse effect on the audio apparatus.

Furthermore, in addition to such adverse effect, the transmission causes variations in power inside the portable phone as well as power of the audio apparatus since the power output during the transmission is about two watts. This set another problem of that these power variations also cause a noise, and the noise can be heard through the speaker or ear-phone microphone.

Accordingly, it would be desired to provide a portable wireless communication terminal with a function of recording/replaying music information and/or a control method thereof, that enables alleviation of noise interference to recording/replaying operations.

Furthermore, it would be desired to provide a portable wireless communication terminal with a function of recording/replaying music information and/or a control method thereof, that enables prevention of a variation in power for a section performing the recording/replaying function in the portable communication terminal, the variation in power being caused by a variation in power for the portable communication terminal due to transmission operation initiated during the recording/replaying operation.

According to one embodiment of the present invention, a portable wireless communication terminal with a wireless communication function and a music recording/replaying function is provided. The portable wireless communication terminal comprises a section judging whether the music recording/replaying function is selected or not, a section determining whether the wireless communication function is to be disable or not when the music recording/replaying function is selected, and a control section enabling or disabling an operation relating to the wireless communication function based on a result of the determination.

The wireless communication terminal in accordance with the one embodiment of the present invention may further comprise a section decreasing a transmitting power of the wireless communication terminal by a predetermined amount during the recording/replaying operation when the music recording/replaying function is selected and the determination of enabling the wireless communication function is made.

According to another embodiment of the present invention, a control method of a portable wireless communication terminal with a wireless communication function and a music recording/replaying function is provided. The control method comprises a step for judging whether the music recording/replaying function is selected or not, a step for determining whether the wireless communication function is to be disable or not when the music recording/replaying function is selected, and a step for performing a control enabling or disabling an operation relating to the wireless communication function based on a result of the determination.

The control method in accordance with the another embodiment of the present invention may further comprise a step for decreasing a transmitting power of the wireless communication terminal by a predetermined amount during the recording/replaying operation when the music recording/replaying function is selected and the determination of enabling the wireless communication function is made.

In the portable wireless communication terminal in accordance with the one embodiment of the present invention, it is determined whether the wireless communication function is to be disable or not when the music recording/replaying function is selected, and the control section enables or disables the wireless communication function based on a result of the determination. Accordingly, the portable wireless communication terminal functions so as to alleviate noise interference to the recording/replaying function due to an operation of the wireless communication function initiated during the recording/replaying operation and variation in power voltage.

In the control method in accordance with the another embodiment of the present invention, it is determined whether the wireless communication function is to be disable or not when the music recording/replaying function is selected, and enables or disables the wireless communication function based on a result of the determination in the control step. Accordingly, the control method functions so as to alleviate noise interference caused by an operation of the wireless communication function initiated during the recording/replaying operation, or, by variation in power voltage inside the portable wireless communication terminal due to such operation.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION

Figure 1:
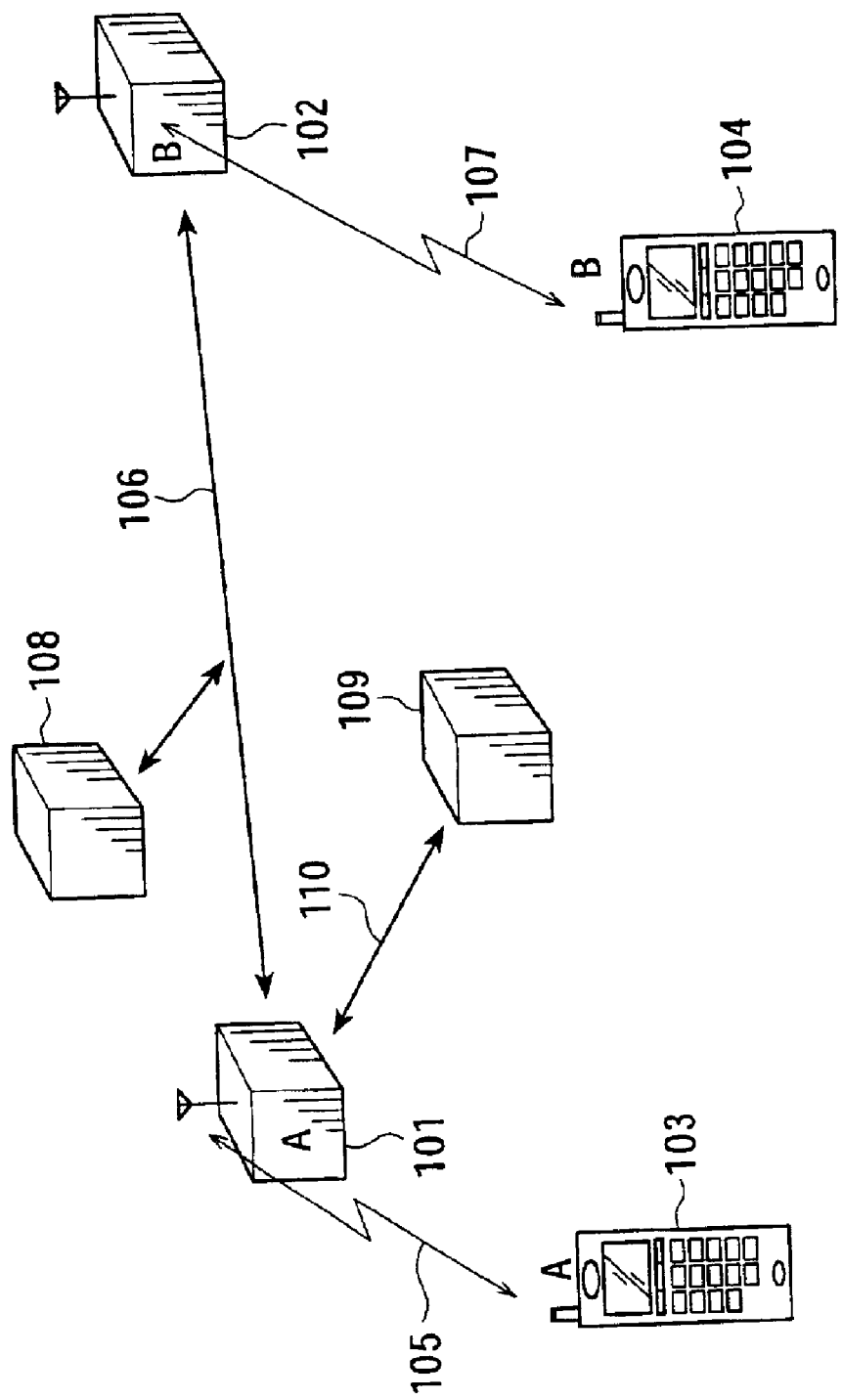
FIG. 1 is a diagram illustrating a structure of a digital cellular system representing a typical concept of a portable terminal and a network.

An embodiment of the present invention will now be described in detail with reference to the attached figures. FIG. 1 shows a structure of a digital cellular system representing a typical concept of a portable terminal and a network. For example, in the figure, an user of the terminal inputs telephone numbers of a counterpart (called party) in a portable phone A 103 to proceed dialing when a call is to make from a portable phone A 103 to a portable phone B 104. Alternatively, the calling operation may be automatically performed with software pre-installed inside the portable phone A 103.

The portable phone A 103 is connected with a portable phone base station A 101 via an air interface A 105. The portable phone base station A 101 is connected with a portable phone base station B 102 via a digital interface 106 (for example, IDSN). A location of the portable phone B 104 is registered in the portable phone base station B 102 via an air interface B 107. Finally, a telephone channel is established between the portable phone A 103 and the portable phone B 104 thereby enabling telephonic communication in-between.

The digital interface 106 connecting the portable phone base station A 101 and the portable phone base station B 102 connects to a public telephone channel (PSTN) station 108. Connecting a wired telephone to the PSTN station 108, the wired telephone can be connected to the portable phone A 103 or the portable phone B 104.

A service provider 109 for an internet is connected with the portable phone base station A 101 via a digital interface 110. The portable phone A 103 can receive a service according to a contract from the service provider 109 via the portable phone base station A 101. The service includes, for example, a download service for revising data, service for receiving other information, or the like.

Figure 2:
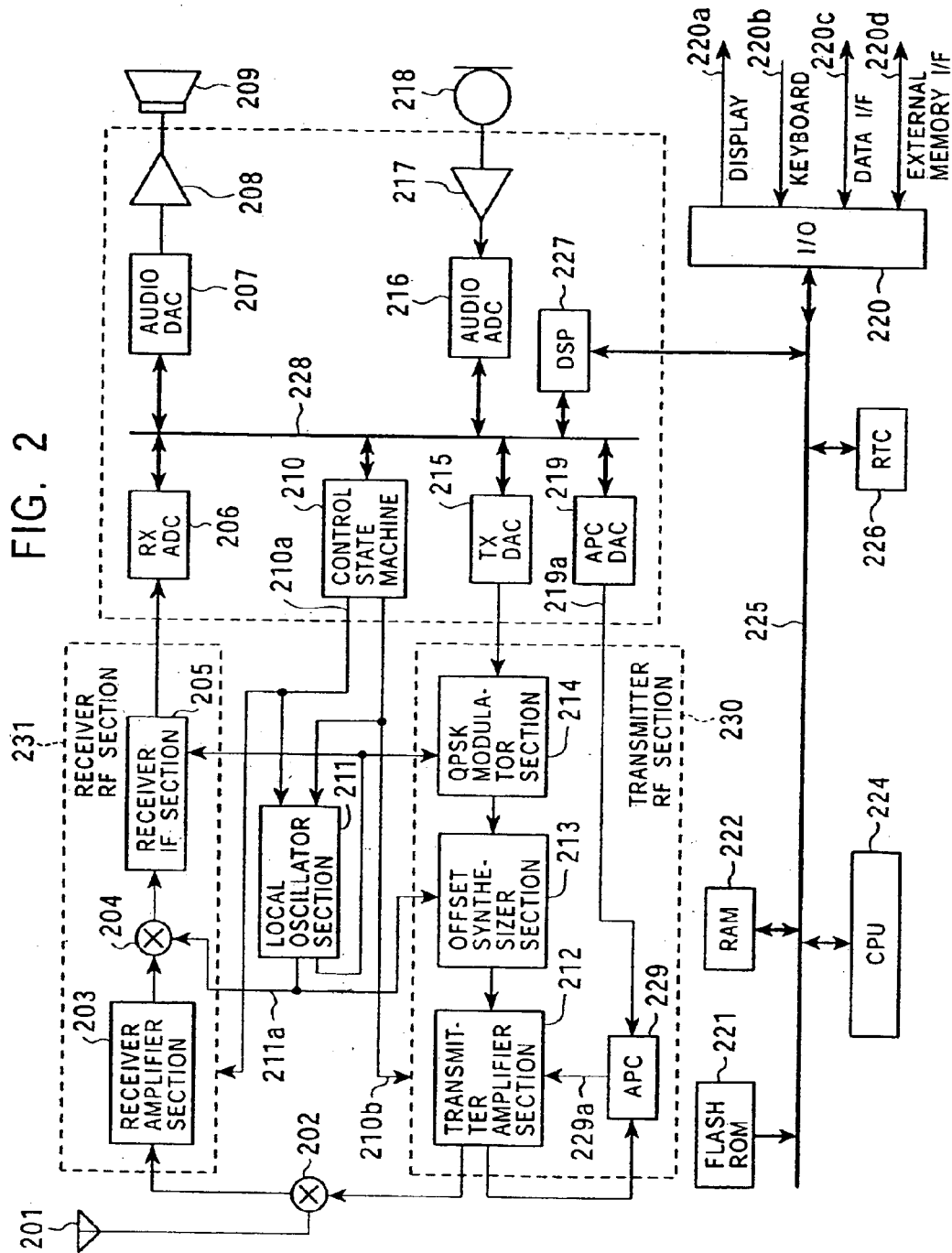
FIG. 2 is a block diagram illustrating a structure of a portable phone in accordance with one embodiment of the present invention.

A construction of a digital cellular portable phone according to one embodiment of the present invention will now be described. FIG. 2 is a block diagram showing a construction of the portable phone according to the present embodiment. In this figure, on the receiving side, a signal received by an antenna 201 is lead to a receiver RF section 231 by an antenna switch 202. The receiver RF section 231 is on/off controlled by a control state machine 210 in accordance with reception timing. A receiver amplifier section 203 performs various processing such as necessary band restriction processing and automatic gain control (AGC) processing so as to set the received signal at an appropriate level.

A frequency transformation is performed by mixing a signal 211a from a local oscillator section 211 and an output from the receiver amplifier section 203 of the receiver RF section 231 at a mixer 204 to convert an arbitrary reception frequency into a constant frequency.

An output from the mixer 204 is inputted to a receiver IF section 205 to be AGC controlled, and then converted into a reception base band signal RX IQ. The reception base band signal RX IQ is analog-to-digital (A/D) transformed by a RX ADC 206 to be an IQ digital data having a constant bit rate.

The IQ digital data is output to and processed in a digital signal processing section (DSP) 227 for removing interferences such as fading, detecting a type of the received signal, de-interleaving, error correction, appropriate demodulation, and separating into voice data and communication data via bus 228.

In a typical case, the voice data is compressed and sent by a block of each receiving burst. The voice data is expanded and decoded by the DSP 227, and then the decoded voice data is digital-to-analog (D/A) converted in an audio DAC 207 in accordance with a voice sampling rate. The D/A converted analog signal is amplified in power by a speaker amplifier 208, and the reproduced voice is outputted from a speaker 209.

The communication data separated in the DSP 227 is eventually reconstructed to an original form and sent to an external apparatus as received data via a CPU bus 225, an input/output (I/O) section 202 and a data interface (I/F) 220c.

On the transmitting side, voice/sound from an user of the terminal or the like is transformed into an analog voice signal via a microphone 218. Output from the microphone 218 has a low signal level and is amplified by a microphone amplifier 217 up to a required voltage. The amplified voice signal is analog-to-digital transformed and digitalized with an appropriate sampling rate at an audio ADC 216. The digitalized signal is encoded and compressed, and then grouped into a block in accordance with a burst signal in a DSP 227.

Digital data inputted from a data I/F 220c of an I/O 220 is grouped into an appropriate block by the DSP 227. Voice coded data and communication data are also grouped by the DSP 227 to generate an I/Q digital data.

The grouped signal is digital-to-analog transformed in a TX DAC 215. A transmission base band signal TX IQ is generated after transforming to an analog modulated signal. Similar to the receiver RF section 231, a transmitter RF section 230 is on/off controlled by the control state machine 210 in accordance with a transmission burst timing.

The transmission base band signal TX IQ is transmitted in synchronization with the transmission burst. The transmission base band signal TX IQ is transformed to an IF modulated signal in a QPSK modulation section 214, and then mixed with a signal for transformation from the local oscillator section 211 in an offset synthesizer section 213 to transform the signal into a predetermined transmitting frequency. The transformed signal having the predetermined frequency is amplified in power by a transmitter amplifier section 212 to obtain a required transmitting power.

Transmitting power data (ramp data) is stored in a flash ROM 221 which is a re-writable type memory. There, the DSP 227 reads out a desired ramp data from the flash ROM 221, and the desired ramp data is digital-to-analog transformed by an APC DAC 219 in accordance with the transmission burst timing.

An output voltage Vtxp 219a of the APC DAC 219 is compared with a wave-detection output voltage 212 of the transmitting power in an APC 229. An output voltage Vapc 229a from the APC 229 indicating a result of the comparison is inputted into a transmitter amplifier section 212 to control the transmitting power. The signal that is power controlled by the transmitter amplifier section 212 is transmitted from the antenna 201 via the antenna switch 202.

A central processing unit (CPU) 224, a memory and the like are connected to a CPU bus 225. Data such as programs executed by the CPU 224 and fonts for display are stored, for example, in a read-only memory (ROM) that is not shown in the figure. A random access memory (RAM) 222 is used, for example, for storing intermediate data in calculation if necessary during execution of a program by the CPU 224, or for temporary storing data to be transformed between a receiving section and a transmission section.

A real time clock (RTC) 226 for time-keeping provides date and time information. For example, the RTC 226 may be used as a time stamp, a time display for the portable phone, an alarm. Alternatively, an electrically erasable memory (EEPROM), which is not shown in the figure, may be provided, for example, so as to store setting parameters before turning-off of power of the portable phone and keep those parameters even after re-turning of power thereby enabling to set up the portable phone at the original setting.

An I/O 220 is used for interfacing with an external apparatus. In this example, the I/O 220 is used to interface a display 220a, a keyboard 220b, a data I/F 220c. An external memory interface I/F 220d is an interface for, for example, storing data in cases in which the data from a detachable semiconductor memory is used in the portable phone itself, or which the data is downloaded from the service provider shown in FIG. 1.

The portable phone in accordance with the present embodiment has functions to record and replay music information while utilizing media such as the detachable and portable external memory apparatus described above or a memory disposed inside the portable phone (for example, re-writable flash ROM 221).

Figure 3:
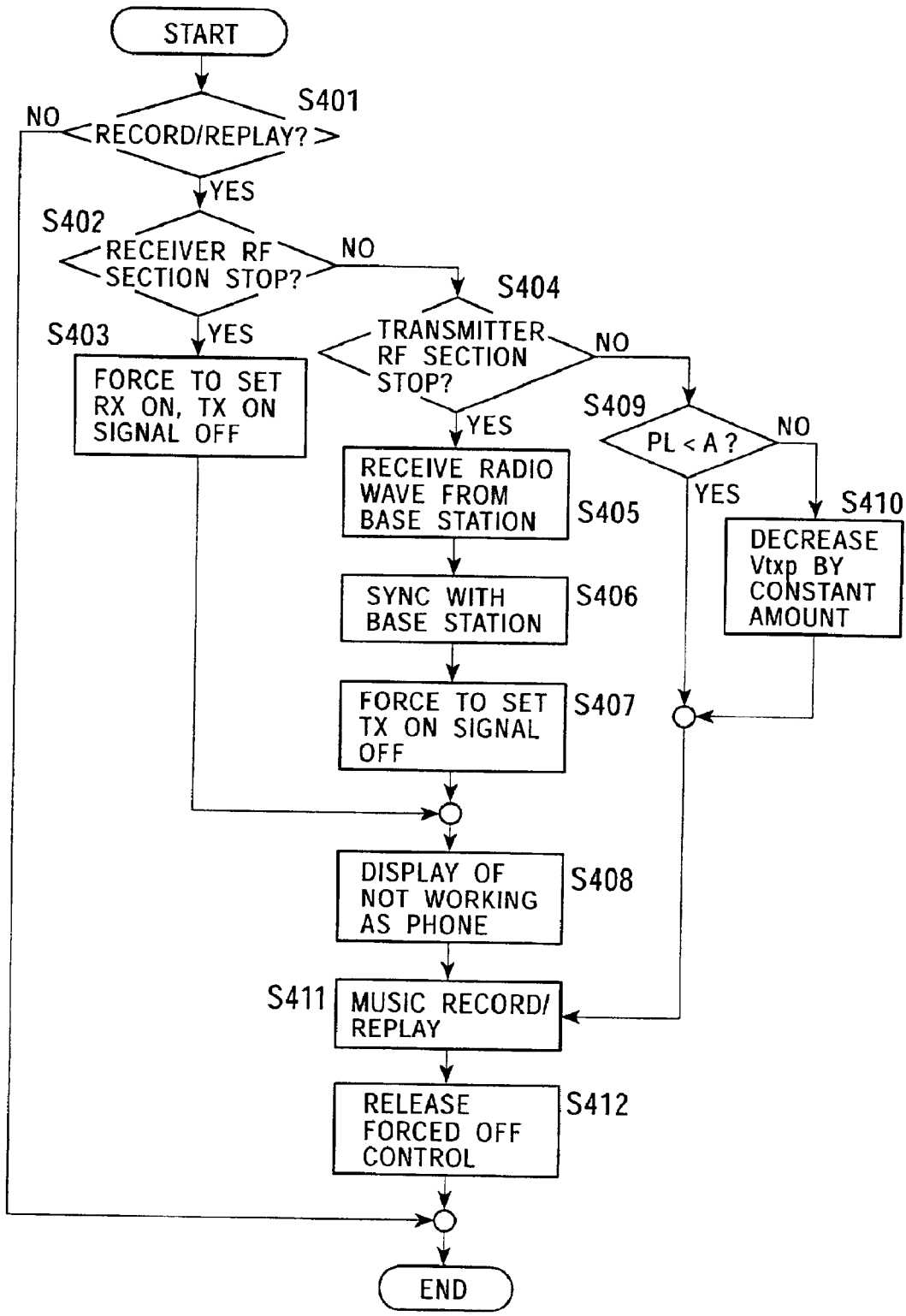
FIG. 3 is a flowchart showing processing steps of the portable phone in accordance with one embodiment of the present invention.

Next, process in the transmitter sections and the receiver sections of the portable phone in accordance with the present embodiment with reference to a flow chart. FIG. 3 is a flow chart showing process steps in the portable phone in accordance with the present invention. In the steps shown in the figure, first, it is determined whether music information is recorded or replayed while utilizing the detachable memory media or the internal memory (for example, flash ROM 221) (step S401). The determination is carried out by the CPU 224 that identifies selection of the user (for example, key operation).

When it is determined that no recording nor replaying of the music information is performed, typical communication functions of the portable phone are kept to continue. The process ends and no further step is performed. When it is determined that the recording or replaying of the music information is selected, it is determined if a receiving operation in the receiver RF section 231 should be stopped or not.

The above determination may be performed every time the process is carried out by asking the user to make the selection each time. Alternatively, the selection information may be stored in the flash ROM 221 and the above determination may be performed based on the stored information.

When it is determined that the operation of the receiver RF section 231 is to be stopped in step S402, the RX ON 210a and the TX ON 210b, that are outputs from the control state machine 210, are forced to set off in step S403 so as to stop all the operations in the receiver RF section 231.

Next, in step S408, a display section (not shown in the figure) displays an indication informing the user that the instant portable phone is not performing the wireless communication functions. Subsequently, the recording or replaying of the music information is carried out in step S411. When the recording or replaying is finished, the off control forced on the receiver RF section is released in step S412, and the process ends.

When the operation of the receiver RF section 231 is selected not to be stopped in step S402, it is further determined whether an operation of the transmitter RF section 230 should be stopped or not in step S404 based on an input from the user or information stored in the memory, similarly to a case in which the operation of the receiver RF section 231 is stopped.

When the operation of the transmitter RF section 230 is selected to be stopped in step S404, only the receiver sections are operated thereby enabling to continuously receive the transmitted signal with the receiver sections from the base station in step S405. Accordingly, the RX ON 210a is controlled to be on or off state as in normal operation in accordance with the reception timing. Further, the receiver sections are controlled to be in sync with the base station as long as the signal reception is possible in step S406.

In step S407, the TX ON 210b is forced to set off according to the selection of the operation stop in the transmitter sections. Accordingly, no transmission can be made from the instant portable phone, nor the transmission to respond a transmission request from the base station (registration of location). This means that the communication functions of the portable phone are not available.

Next, in step S408, the display section displays the indication informing the user that the instant portable phone is not performing the wireless communication functions. Subsequently, the recording or replaying of the music information is carried out in step S411. When the recording or replaying is finished, the off control forced on the transmitter RF section is released in step S412, and the process ends.

When the selection is made for not stopping the operation of the transmitter RF section 230 in step S404, it means that the user wishes to record or replay the music information as well as to keep the operation of the communication functions including operations of the receiver sections and transmitter sections of the portable phone. In this case, there is possibility of influence onto the audio-related sections of the portable phone due to the transmitting power. In other words, some measures are required in the portable phone to alleviate the influence of the transmitting power onto the audio-related sections of the portable phone.

For example, a desired transmitting power is determined by the base station for each portable phone in GSM system. An acceptable variation in the transmitting power is defined in GSM recommendation. Accordingly, in step S409, it is judged whether a transmitting power level (PL) of the portable phone is smaller than a power level (A) that will not influence on the audio-related sections of the portable phone.

When the portable phone transmits signal with the transmitting power having a transmitting power level (PL) equal or larger than the power level (A) (no in step S409), the process advances to step S410. In step S410, the signal Vtxp 219a controlling the transmitting power is controlled to decrease by a prescribed amount so as that the transmitting power level (PL) becomes less than the power level (A). This processing is performed by the CPU 224 or the DSP227 shown in FIG. 2.

If the transmission is necessary, data relating to the above-described processing is stored in a register (not shown in the figure) of the APC DAC 219. When the transmission is requested during the recording/replaying of the music information (step S411), the transmission is carried out with a power lower than a power used in a normal operation based on the data stored in the register.

Figure 4:
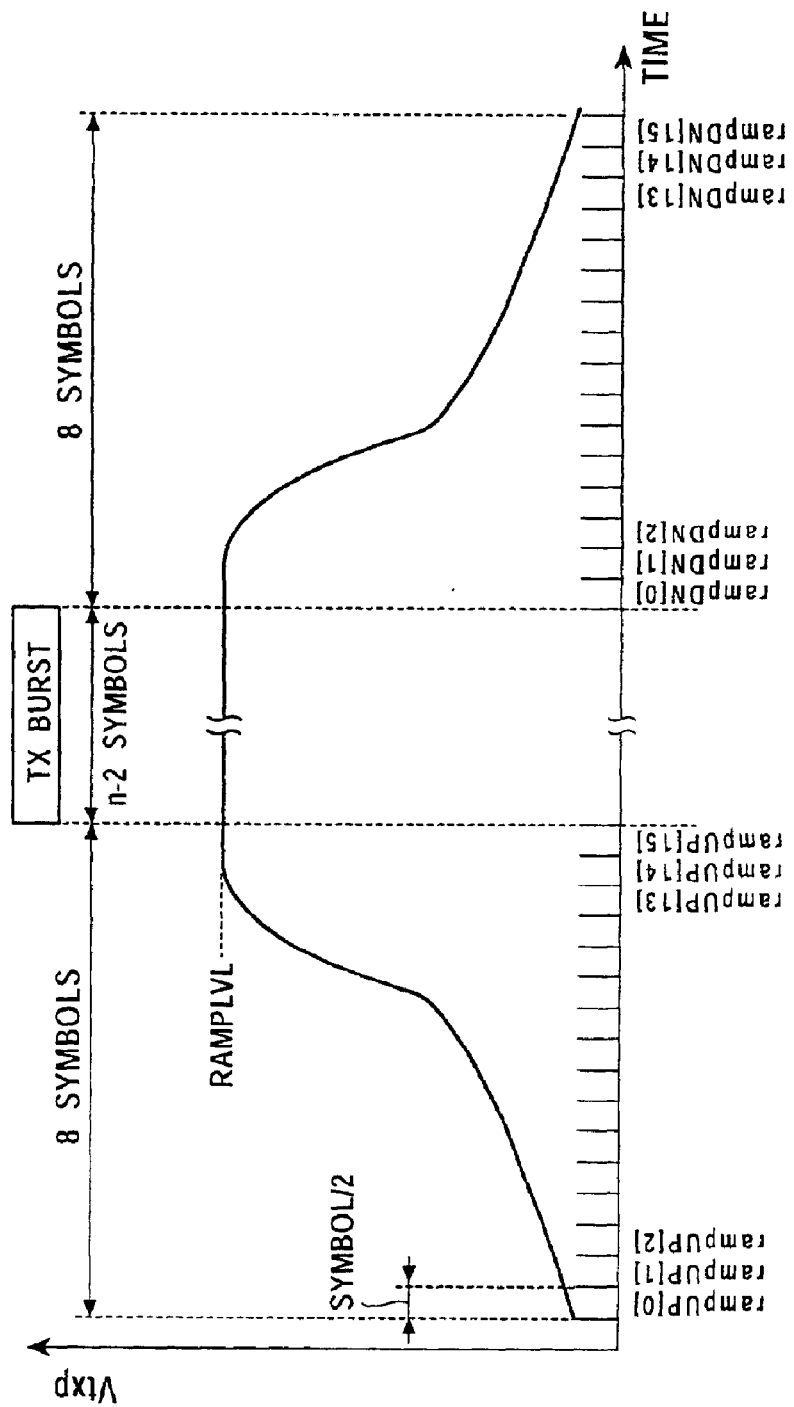
FIG. 4 is a diagram showing a power ramp timing.

FIG. 4 is a diagram showing a power ramp timing. As described in the above, the Vtxp 219b is a signal to be used for adjusting the transmitting power of the portable phone so as to obtain a desirable power. As shown in FIG. 4, a level of the Vtxp signal is increased gradually (ramp up) before a data start of transmission burst (TX burst). This gradual increase of the signal level is required to prevent spreading of frequency spectrum due to sharp rise-up of the transmitting power.

A value of the Vtxp is kept the same after the transmission burst has been started following a rise of the Vtxp value to a control voltage corresponding to a desired value of the transmitting power of the portable phone (RAMPLVL in FIG. 4). When the transmission burst is completed, the transmitting power is decreased gradually by decreasing the Vtxp value (ramp down) similarly to the case in which the transmitting power is gradually increased.

In the present embodiment, the transmitting power control signal Vtxp is decreased by a prescribed amount in step S410 shown in FIG. 3. In this case, data of the ramp-up (rampUP[0]–[15]) and data of the ramp-down (rampDN[0]–[15]) are required to decrease by a prescribed amount in addition to the decrease of the RAMPLVL by a prescribed amount. This modification is necessary to prevent occurring of discontinuation in ramp wave form.

Accordingly, in the processing of the Vtxp decrease by a prescribed amount, the RAMPLVL is decreased to the lowest limit defined in GSM output power regulation, and the rampUP[0]–[15] and the rampDN[0]–[15] are decreased in accordance with the RAMPLVL.

In the power ramp timing shown in FIG. 4, a symbol length is $48/13\,\mu s$, and n is 147 normal burst, 87 access burst.

As described above, according to the present embodiment, the audio-related sections of the portable phone can function without any deterioration by stopping operations of the transmitter sections and/or the receiver sections to disable the telephone communication functions thereby preventing noise interference onto the music recording/replaying operations, which is caused by influence of transmission wave from the phone (transmitting power) or by the power voltage variation.

Furthermore, the original telephone communication functions can be restored in short period of time if necessary and the registration of location can be performed quickly by reserving the receiving function while stopping the transmitting function during the music information recording/replaying operation thereby enabling to keep the synchronization with the base station even though the telephone communication function can not be performed.

As described above, according to the portable wireless communication terminal according to an embodiment of the present invention, it is possible to provide the audio functions in the terminal while preventing the noise interference, which is caused by influence of transmission wave from the terminal or by the power voltage variation when the transmitting operation is initiated, onto the music recording/replaying operations by having a section judging whether the music recording/replaying function is selected or not, a section determining whether the wireless communication function is to be disable or not when the music recording/replaying function is selected, and a control section enabling or disabling an operation relating to the wireless communication function based on a result of the determination.

Furthermore, according to the control method for a portable wireless communication terminal having wireless communication functions and music recording/replaying functions according to another embodiment of the present invention, it is possible to prevent occurring of trouble such as the noise interference caused by transmitting power of the terminal itself or the power voltage variation inside the terminal when the transmitting operation is initiated by having a step for judging whether the music recording/replaying function is selected or not, a step for determining whether the wireless communication function is to be disable or not when the music recording/replaying function is selected, and a step for performing a control enabling or disabling an operation relating to the wireless communication function based on a result of the determination.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

What is claimed is:

1. A portable wireless communication terminal with a wireless communication function and a music recording and/or replaying function comprising:

a detector configured to detect selection of said music recording/replaying function;

a determination section configured to determine whether said wireless communication function is to be disabled or not when the selection of said music recording/replaying function is detected;

a controller configured to control operations of said wireless communication function based on a result of the determination of said determination section; and a section decreasing a transmitting power of said portable wireless communication terminal by a predetermined amount during music recording/replaying operation if said music recording/replaying function is selected and enabling said wireless communication function is determined.

2. The portable wireless communication terminal according to claim 1, wherein:
said controller disables a receiving operation relating to said wireless communication function.

3. The portable wireless communication terminal according to claim 1, wherein:
said controller disables a transmitting operation relating to said wireless communication function.

4. The portable wireless communication terminal according to claim 3, further comprising:
   a section maintaining synchronization between a base station and said portable wireless communication terminal when only receiving operation relating to said wireless communication function is enabled.

5. The portable wireless communication terminal according to claim 1, wherein:
   said controller disables a receiving operation and a transmitting operation relating to said wireless communication function.

6. The portable wireless communication terminal according to claim 1, wherein:
   a level of said transmitting power is less than a level of transmitting power of case in which only operations relating to said wireless communication function are enabled.

7. The portable wireless communication terminal according to claim 1, further comprising:
   an indicator informing that said wireless communication function is not operating.

8. The portable wireless communication terminal, according to claim 1, further comprising:
   display means to display a message that the wireless communication function is not in use.

9. A control method for a portable wireless communication terminal with a wireless communication function and a music recording and/or replaying function comprising the steps of:
   detecting selection of said music recording/replaying function;
   determining whether said wireless communication function is to be disabled or not when the selection of said music recording/replaying function is detected;
   controlling operations of said wireless communication function based on a result of said determining step; and
   decreasing a transmitting power of said portable wireless communication terminal by a predetermined amount during music recording/replaying operation if said music recording/replaying function is selected and enabling of said wireless communication function is determined.

10. The control method according to claim 9, wherein:
    a receiving operation relating to said wireless communication function is disabled in said step for controlling.

11. The control method according to claim 9, wherein:
    a transmitting operation relating to said wireless communication function is disabled in said step for controlling.

12. The control method according to claim 9, wherein:
    a receiving operation and a transmitting operation relating to said wireless communication function are disabled in said step for controlling.

13. The control method for a portable wireless communication terminal with a wireless communication function and a music recording and/or replaying function according to claim 9, further comprising the steps of:
    displaying a message indicating a use status of the wireless communication function.

14. A portable wireless communication terminal with a wireless communication function and a music recording and/or replaying function comprising:
    a detector configured to detect selection of said music recording/replaying function;
    a determination section configured to determine which of a receiving function and a transmitting function of said wireless communication function is to be disabled when the selection of said music recording/replaying function is detected;
    a controller configured to control said wireless communication function to disable both a receiving operation and a transmitting operation when said receiving function is determined to be disabled by said determination section, and to disable only the transmitting operation when said transmitting function is determined to be disabled by said determination section; and
    a section decreasing a transmitting power of said portable wireless communication terminal by a predetermined amount during music recording/replaying operation if said music recording/replaying function is selected and enabling of said wireless communication function is determined.

15. The portable wireless communication terminal with a wireless communication function and a music recording and/or replaying function according to claim 14, further comprising:
    display means to display a message that the wireless communication function is not in use.

16. A portable wireless communication terminal with a wireless communication function and a music recording and/or replaying function comprising:
    a detector configured to detect selection of said music recording/replaying function;
    a controller configured to determine whether said wireless communication function is to be disabled or not when the selection of said music recording/replaying function is detected, and to control operations of said wireless communication function based on a result of the determination; and
    a section decreasing a transmitting power of said portable wireless communication terminal by a predetermined amount during music recording/replaying operation if said music recording/replaying function is selected and enabling of said wireless communication function is determined.

17. The portable wireless communication terminal, according to claim 16, further comprising:
    display means to display a message that the wireless communication function is not in use.

18. An apparatus having a wireless communication function and a data recording and/or reproducing function comprising:
    means for detecting selection of said data recording/replaying function;
    means for determining whether said wireless communication function is to be disabled or not when the selection of said data recording/replaying function is detected;
    means for controlling said wireless communication function based on a result of said determination; and
    means for decreasing a transmitting power of said portable wireless communication terminal by a predetermined amount during music recording/replaying operation if said music recording/replaying function is selected and enabling of said wireless communication function is determined.

19. The apparatus having a wireless communication function and a data recording and/or reproducing function, according to claim 18, further comprising:
    display means to display a message that the wireless communication function is not in use.

* * * * *